United States Patent

[11] 3,600,662

[72] Inventor Elmar Anwander
       Baden, Switzerland
[21] Appl. No. 848,222
[22] Filed Aug. 7, 1969
[45] Patented Aug. 17, 1971
[73] Assignee Aktiengesellschaft Brown, Boveri & Cie
       Baden, Switzerland
[32] Priority Aug. 9, 1968
[33]       Switzerland
[31]       12,046/68

[54] POWER DIRECTION REVERSAL IN ASYNCHRONOUS MAINS COUPLINGS
3 Claims, 1 Drawing Fig.
[52] U.S. Cl. .................................................. 321/4,
                                                    307/19, 307/127
[51] Int. Cl. ..................................................... H02m 5/40
[50] Field of Search ........................................... 307/19, 45,
                                                   82, 127; 321/4

[56]              References Cited
              UNITED STATES PATENTS
3,205,428  9/1965  Kerr et al. ..................... 307/127 X
3,214,664  10/1965 Ishikawa ........................ 307/127 X
3,218,485  11/1965 Takai ............................ 307/127
3,247,445  4/1966  Vaughan ........................ 307/127 X
3,275,838  9/1966  Almstrom ...................... 321/4 X
3,422,338  1/1969  Philipps ........................ 321/10 X

*Primary Examiner*—William M. Shoop, Jr.
*Attorney*—Pierce, Scheffler and Parker

ABSTRACT: An arrangement for effecting an exchange in the direction of power flow from one three-phase mains operating at one frequency to a second three-phase mains operating at a different frequency comprises a converter system interconnected between and coupling the two three-phase mains together, the converter system including a rectifier of the semiconductor-type for converting the alternating current at the frequency of one of the mains to direct current and an inverter of the semiconductor type for converting the direct current back into alternating current at the frequency of the other mains. In order that diodes exclusively may be used in one converter, i.e. the rectifier, and thyristors exclusively used in, the other converter, i.e. the inverter, a system of cross-connections and switching means is utilized between the mains and the input and output sides of the converter so that the power is caused always to flow through the converter in the same direction regardless of the direction in which the power flows between the two mains.

PATENTED AUG 17 1971
3,600,662
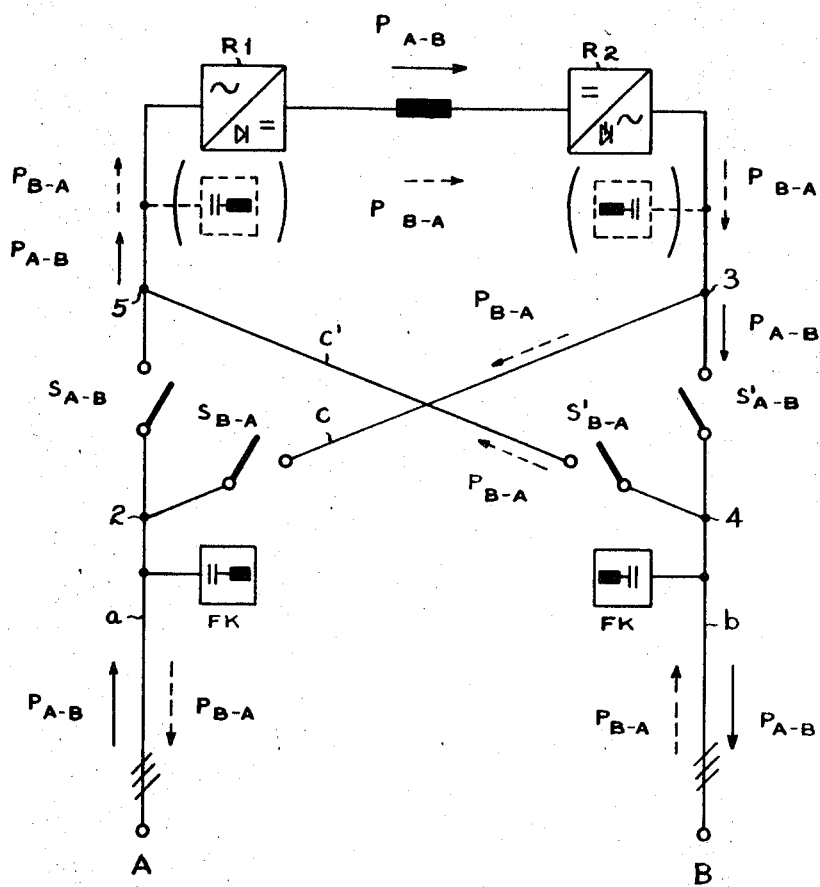
INVENTOR.
Elmar Anwander
BY
Pierce, Scheffler & Parker
Attorneys

POWER DIRECTION REVERSAL IN ASYNCHRONOUS MAINS COUPLINGS

The present invention relates to power direction reversal in asynchronous mains couplings, and particularly in the case of short couplings with semiconductors for transmission of high voltage direct current, known generally by the term "H-VOCT."

The reversal of the direction of power in HGU short couplings has been effected up to now generally by reversing the polarity of the voltage in the intermediate DC circuit. The polarity of the voltage was reversed electronically by means of ignition impulse displacement, by switching the rectifier to inverter operation and at the same time the inverter to rectifier operation.

With regard to the state of technology, reference is made, for example, to an article by I. Takei: "Sakuma Frequency Converter Project" in the journal: "Transactions A.I.E.E.," vol. 85, part III-A (Power Apparatus and Systems) May 1965, p. 411—415. The article describes the realization of a frequency coupling between asynchronous mains of 60 cycles in North Japan and 50 cycles in South Japan over an intermediate DC circuit provided with controllable mercury vapor valves, where the reversal of the power direction is effected in the above described manner by reversing the polarity of the voltage in this DC circuit.

However, this known solution requires that both coupling halves be equipped with controllable converter valves. If mercury vapor valves are used, this has no adverse economical effect, but it has an adverse economical effect in the case of semiconductor valves, because the price difference between the controlled valves (thyristors) and the uncontrolled elements (diodes) is considerable, so that a solution based on the exclusive use of controlled valves is in any case costly and relatively complicated.

The invention is based on the problem of permitting the reversal of the power direction in asynchronous mains couplings with much less expenditure. This is achieved according to the invention in that the reversal is effected without any measures in the DC circuit merely by switching devices such as circuit breakers or disconnect switches arranged on the three-phase current side and laid out for three-phase current in such manner that the input and output of the mains coupling are interchanged.

In the solution suggested according to the invention, the thyristors in the DC circuit thus can be replaced at least partly by substantially cheaper uncontrolled elements in the form of semiconductor diodes.

One suitable embodiment of an asynchronous alternating current mains coupling for coupling one AC frequency to another through an intermediate direct current circuit and which includes the novel switching arrangement for effecting a reversal of the direction of power flowing between the two mains will now be described and is shown in the accompanying drawing, the single figure of which is presented in schematic form to simplify illustration.

Referring now to the drawing, which shows only one phase of the usual 3-phase arrangement, but designates it as three-phase by the standard symbol (⚡) one of the 3-phase mains of one frequency is indicated by the letter "A" and the other 3-phase mains of a different frequency is indicated by the letter "B." The two AC mains are interconnected by an intermediate direct current circuit and the direction of current flow through the intermediate DC circuit is the same regardless of the direction of power flow as between the two different AC mains.

The intermediate DC circuit includes two semiconductor powered converter sections R1 and R2 of known construction which serve to convert the alternating current of one frequency in one of the two mains into a direct current and then reconvert the direct current into an alternating current corresponding to the frequency of the other mains. Thus, the converter section R1 operates as a rectifier using uncontrolled semiconductors, i.e. diodes for converting AC to DC and the second converter section R2 operates as an inverter using controllable semiconductors, i.e. thyristors for converting the DC into AC at the required frequency. In accordance with the inventive concept, converter section R1 equipped entirely with relatively low cost diodes always operates as a rectifier converting AC to DC and converter section R2 equipped entirely with thyristors always operates as an inverter reconverting the DC to AC regardless of whether the power exchange is from the AC mains "A" to AC mains "B," or vice versa. The rectifier and inverter operational characteristics are indicated on the drawing by the conventional symbols ∼ and ⚌. A switch device $S_{A-B}$ which can be in the form of a power circuit breaker or a blade type disconnect switch is interposed in the line $a$ extending from mains A to the alternating current input side of the converter device R1 and another such switching device $S'_{A-B}$ is interposed in the line $b$ extending from the alternating current output side of the converter device R2 to the other mains B.

A cross-connection line $c$ extends from a tap point 2 on line $a$ located between the mains A and switch $S_{A-B}$ to a tap point 3 on line $B$ located between the output side of the converter device R2 and switch $S'_{A-B}$. Similarly, a cross-connection line $c'$ extends from a tap point 4 on line $b$ located between the mains B and switch $S'_{A-B}$ to a tap point 5 on line $a$ located between the input side of the converter device R1 and switch $S_{A-B}$. A switch $S_{B-A}$ is interposed in line $c$ and another switch $S'_{B-A}$ is interposed in the line $c'$.

A filter circuit FK for compensating harmonic currents and idle power is associated with each of the mains A and B. In certain cases, these filter circuits can be associated with the converter devices R1 and R2 and switched, in a power reversal, from one mains to the other by use of auxiliary switching means not illustrated. This has been indicated schematically by the broken line showing of these filter circuits FK within brackets. This expedient results in a further savings in expenditures for the filter circuit, compared to the usual solution.

Power reversal as between the two mains A and B takes place in the following manner. If it be assumed that power is desired to flow from mains A to mains B, this condition being designated by the solid arrows $P_{A-B}$ switches, switches $S_{A-B}$ and $S'_{A-B}$ will be moved to a closed position, and switches $S_{B-A}$ and $S'_{B-A}$ will be moved to an open position. With the four switches in these designated positions, it will be seen that power from mains A passes through switch $S_{A-B}$ into and through the converters R1 and R2, for production of AC at the frequency of mains B, and thence through switch $S'_{A-B}$ to mains B.

If it is now desired to reverse the direction of power flow, i.e. from mains B to mains A, this power direction being designated by the broken line arrows legended $P_{B-A}$, switches $S_{A-B}$ and $S'_{A-B}$ will be shifted to their open position, and switches $S_{B-A}$ and $S'_{B-A}$ will be shifted to their closed position. With the four switches in these designated positions, it will be seen that power from mains B passes through the closed switch $S'_{B-A}$ and cross-connection line $c'$ in which this switch is located from tap point 4 in line $b$ to tap point 5 in line $a$ from whence it is passed through the converters R1 and R2 for production of AC at the frequency of mains A and thence through cross-connection line $c$ and closed switch $S_{B-A}$ from tap point 3 at the output side of converter R2 to tap point 2 in line $a$ to the novel arrangement of the four power changeover switches and the cross-connection lines, it will be seen that power flow through the intermediate DC circuit, i.e. the converters R1 and R2, is always in the same direction regardless of the direction in which power flows as between the two AC mains A and B and all that is required is a change in the operating frequency of the inverter R2.

The power reversing arrangement as disclosed requires that the 3-phase mains A and B be of the same type. If this is not already the case, one of the two mains can be adapted to the other by use of an autotransformer.

As can be seen, the intermediate DC circuit can be designed in one coupling half in the form of a diode bridge without auxiliary controls, which means a considerable reduction in cost, as compared with known arrangements for effecting a power reversal.

I claim:

1. In an arrangement for establishing a reversible exchange of power as between two alternating current systems operating at different frequencies wherein the power can be made to flow from the first system to the second system, or vice versa, the combination comprising a converter including a rectifier section which always operates to convert the alternating current of one or the other of said systems into direct current, said rectifier section being constituted entirely by rectifier elements of the diode-type, and an inverter section connected to the direct current output of said rectifier section which always operates to reconvert the direct current into alternating current at the frequency of the system to which its output is connected, said inverter section being constituted entirely by controllable rectifier elements such as thyristors, first switching means correlated to the first alternating current system and which are operable to connect the first alternating current system alternatively to the input of said rectifier section or the output from said inverter section, and second switching means correlated to the second alternating current system and which are operable to connect the second alternating current system alternatively to the input of said rectifier section or the output from said inverter section, said first alternating current system being connected through said first switching means to the input of said rectifier section when said second alternating current system is connected through said second switching means to the output from said inverter section to transfer power from said first system to said second system, and said second alternating current system being connected through said second switching means to the input of said rectifier section when said first alternating current system is connected through said first switching means to the output from said inverter section, to transfer power from said second system to said first system.

2. A reversible power exchange arrangement as defined in claim 1 for two alternating current systems operating at different frequencies wherein said first switching means includes one switch for connecting said first alternating current system to the input of said rectifier section and a second switch located in a cross-connection line extending from said first alternating current system to the output of said inverter section, and wherein said second switching means includes one switch located in a cross-connection line extending from said second alternating current system to the input of said rectifier section and a second switch for connecting said second alternating current system to the output from said inverter section.

3. A reversible power exchange arrangement as defined in claim 1 for two alternating current power systems operating at different frequencies and which further includes filter circuits selectively connectable to said power systems for compensating harmonic currents and idle power.